(12) United States Patent
Lee

(10) Patent No.: US 7,925,120 B2
(45) Date of Patent: Apr. 12, 2011

(54) METHODS OF IMAGE PROCESSING WITH REDUCED MEMORY REQUIREMENTS FOR VIDEO ENCODER AND DECODER

(75) Inventor: Kun-Bin Lee, Taipei (TW)

(73) Assignee: MediaTek Inc., Science-Based Industrial Park, Hsin-Chu Hsien (TW)

( * ) Notice: Subject to any disclaimer, the term of this patent is extended or adjusted under 35 U.S.C. 154(b) by 1549 days.

(21) Appl. No.: 11/164,207

(22) Filed: Nov. 14, 2005

(65) Prior Publication Data

US 2007/0110325 A1    May 17, 2007

(51) Int. Cl.
*G06K 9/54* (2006.01)
(52) U.S. Cl. ...................................... 382/305; 382/232
(58) Field of Classification Search .......... 375/240.12–240.14, 240.16, 240.17; 382/232, 236, 305
See application file for complete search history.

(56) References Cited

U.S. PATENT DOCUMENTS

| | | | |
|---|---|---|---|
| 5,329,318 A * | 7/1994 | Keith ............................ 348/699 |
| 5,510,840 A * | 4/1996 | Yonemitsu et al. ...... 375/240.15 |
| 5,777,677 A | 7/1998 | Linzer et al. | |
| 6,075,906 A | 6/2000 | Fenwick et al. | |
| 6,310,919 B1 | 10/2001 | Florencio | |
| 6,480,542 B1 | 11/2002 | Prange et al. | |
| 6,792,149 B1 | 9/2004 | Florencio | |
| 6,836,273 B1 * | 12/2004 | Kadono ........................ 345/543 |
| 7,072,399 B2 * | 7/2006 | Winger et al. ........... 375/240.16 |
| 2005/0268200 A1 * | 12/2005 | Garudadri et al. ............ 714/746 |
| 2006/0153303 A1 * | 7/2006 | Hsu et al. .................. 375/240.25 |

FOREIGN PATENT DOCUMENTS

| | | |
|---|---|---|
| CN | 1599458 A | 3/2005 |
| JP | H08-205192 | 8/1996 |

* cited by examiner

*Primary Examiner* — Matthew C Bella
*Assistant Examiner* — Dennis Rosario
(74) *Attorney, Agent, or Firm* — Winston Hsu; Scott Margo

(57) ABSTRACT

A method of performing image processing includes storing a reference picture into a frame buffer starting at a first starting address; overwriting at least a subset of the reference picture by storing at least a portion of a current picture into the frame buffer starting at a second starting address; protecting a plurality of blocks of the reference picture from being lost while storing each block of the current picture in the frame buffer; and performing a motion compensation procedure for a particular block of the current picture in the plurality of blocks of the reference picture that are being protected.

23 Claims, 11 Drawing Sheets

METHODS OF IMAGE PROCESSING WITH REDUCED MEMORY REQUIREMENTS FOR VIDEO ENCODER AND DECODER

BACKGROUND

The invention relates to image processing for encoding or decoding video signals, and more particularly, to methods of performing motion compensation or motion estimation having reduced memory requirements when encoding or decoding video.

The Moving Picture Experts Group (MPEG) standards such as MPEG-2 (ISO-13818) are widely utilized with video applications. The MPEG-2 standard describes an encoded and compressed bit-stream that has substantial bandwidth reduction. The compression is a subjective loss compression followed by a lossless compression. The encoded, compressed digital video data is subsequently decompressed and decoded by an MPEG-2 standard compliant decoder.

The MPEG-2 standard specifies a bit-stream form encoded by a very high compression technique that achieves overall image bit-stream compression not achievable with either intraframe coding alone or interframe coding alone, while preserving the random access advantages of pure intraframe coding. The combination of block based frequency domain intraframe encoding and interpolative/predictive interframe encoding of the MPEG-2 standard results in a combination of intraframe encoding advantages and interframe encoding advantages.

The MPEG-2 standard specifies predictive and interpolative interframe encoding and frequency domain intraframe encoding. Block based motion estimation and motion compensation are utilized for the reduction of temporal redundancy, and block based Discrete Cosine Transform (DCT) based compression is utilized for the reduction of spatial redundancy. Under the MPEG-2 standard, motion compensation is achieved by predictive coding, interpolative coding, and Variable Length Coded (VLC) motion vectors. The information relative to motion is based on a 16×16 array of pixels and is transmitted with the spatial information. Motion information is compressed with Variable Length Codes, such as Huffman codes.

In general, there are some spatial similarities in chromatic, geometrical, or other characteristic values within a picture/image. In order to eliminate these spatial redundancies, it is required to identify important elements of the picture and to remove the redundant elements that are less important or are repeated. For example, according to the MPEG-2 standard, a picture is compressed by eliminating the spatial redundancies by chrominance sampling, discrete cosine transform (DCT), and quantization. In addition, video data is actually formed by a continuous series of pictures, which are perceived as a moving picture due to the persistence of pictures in the vision of human eyes. Since the time interval between pictures is very short, the difference between neighboring pictures is very tiny and mostly appears as a change of location of visual objects. Therefore, the MPEG-2 standard eliminates temporal redundancies caused by the similarity between consecutive pictures to further compress the video data.

In order to eliminate the temporal redundancies mentioned above, a process referred to as motion estimation or motion compensation is employed in the MPEG-2 standard. Motion estimation or motion compensation relate to determining the redundancy between pictures. Before performing motion compensation, a current picture to be processed is typically divided into 16×16 pixel sized macro-blocks (MB). For each current macro-block, a most similar prediction block of a reference picture (which can be a preceding picture or a succeeding picture) is then determined by comparing the current macro-block with "candidate" macro-blocks of the reference picture. The most similar prediction block is treated as a reference block and the location difference between the current block and the reference block is then recorded as a motion vector. The above process of obtaining the motion vector is referred to as motion estimation. If the picture to which the reference block belongs is prior to the current picture, the process is called forward prediction. If the reference picture is posterior to the current picture, the process is called backward prediction. In addition, if the motion vector is obtained by referring both to a preceding picture and a succeeding picture of the current picture, the process is called bi-directional prediction. A commonly employed motion estimation method is a block-matching method. Because the reference block may not be completely the same with the current block, when using block-matching, it is required to calculate the difference between the current block and the reference block, which is also referred to as a prediction error. The prediction error is used for decoding the current block.

The MPEG 2 standard defines three encoding types for encoding pictures: intra encoding, predictive encoding, and bi-directionally predictive encoding. An intra-coded picture (I picture) is encoded independently without using a preceding picture or a succeeding picture. A predictive encoded picture (P picture) is encoded by referring to a preceding reference picture, wherein the preceding reference picture should be an I picture or a P picture. In addition, a bi-directionally predictive picture (B picture) is encoded using both a preceding picture and a succeeding picture. Bi-directionally predictive pictures (B pictures) have the highest degree of compression and require both a past picture and a future picture for reconstruction during decoding. I pictures and P pictures can be used as reference pictures to encode or decode other pictures. As B pictures are never used to decode other pictures, B pictures are also referred to as non-reference pictures. Note that in other video compression standard such as H.264, B pictures can be used as a reference to decode other pictures. Hence, the picture encoding types belonging to either reference picture or non-reference picture may vary according to different video compression standard.

As mentioned above, a picture is composed of a plurality of macro-blocks, and the picture is encoded macro-block by macro-block. Each macro-block has a corresponding motion type parameter representing its motion compensation type. FIG. 1 shows a conventional block-matching process of motion estimation. A current picture 120 is divided into blocks. Each block can be any size. For example, in the MPEG standard, the current picture 120 is typically divided into macro-blocks having 16×16 pixels. Each interframe coded block in the current picture 120 is encoded in terms of its difference from a block in a preceding picture 110 or a succeeding picture 130. During the block-matching process of a current block 100, the current block 100 is compared with similar-sized "candidate" blocks within a search range 115 of the preceding picture 110 or within a search range 135 of the succeeding picture 130. The candidate block of the preceding picture 110 or the succeeding picture 130 that is determined to have the smallest difference with respect to the current block 100, e.g. a block 150 of the preceding picture 110, is selected as a reference block. The motion vectors and residues between the reference block 150 and the current block 100 are computed and coded. As a result, the current block 100 can be restored during decompression using the coding of the reference block 150 as well as the motion vectors and residues for the current block 100.

The basic unit for motion compensation under the MPEG-2 Standard is a macro-block. The MPEG-2 standard sized macro-blocks are 16×16 pixels. Motion information consists of one vector for forward predicted macro-blocks, one vector for backward predicted macro-blocks, and two vectors for bi-directionally predicted macro-blocks. In this way a macro-block of pixels is predicted by a translation of a macro-block of pixels from a past or future picture. The difference between the source pixels and the predicted pixels is included in the corresponding bit-stream. That is, the output of the video encoder is a digital video bit-stream comprising encoded pictures that can be decoded by a decoder system.

FIG. 2 shows a difference between the display order and the decoding order of pictures of the MPEG-2 standard. As mentioned, the MPEG-2 standard provides temporal redundancy reduction through the use of various predictive and interpolative tools. This is illustrated in FIG. 2 with the use of three different types of frames (also referred to as pictures): "I" intra-coded pictures, "P" predicted Pictures, and "B" bi-directional interpolated pictures. As shown in FIG. 2, in order to encode or decode pictures being P pictures or B pictures, the picture transmission order in the digital video bit-stream is not the same as the desired picture display order.

A decoder adds a correction term to the block of predicted pixels to produce the reconstructed block. Typically, a video decoder receives the digital video bit-stream and generates decoded digital video information, which is stored in an external memory area in frame buffers. As described above and illustrated in FIG. 2, each macro-block of a P picture can be coded with respect to the closest previous I picture, or with respect to the closest previous P picture. Each macro-block of a B picture can be coded by forward prediction from the closest past I picture or P picture, by backward prediction from the closest future I picture or P picture, or bi-directionally using both the closest past I picture or P picture and the closest future I picture or P picture. Therefore, in order to properly decode all the types of encoded pictures and display the digital video information, at least the following three frame buffers are required:

1. Past reference frame buffer
2. Future reference frame buffer
3. Current frame buffer Each buffer must be large enough to hold a complete picture of digital video data (e.g., 720×480 pixels for MPEG-2 Main Profile/Main Level). Additionally, as is well known by a person of ordinary skill in the art, both luminance data and chrominance data require similar processing. In order to keep the cost of the video decoder products down, an important goal has been to reduce the amount of memory (i.e., the size of the frame buffers) required to support the decode function.

For example, different related art methods reduce memory required for decompression of a compressed frame by storing frame data in the frame buffers in a compressed format. During operations, the compressed frame is decompressed by the decoder module to obtain a decompressed frame. However, the decompressed frame is then compressed by an additional compression module to obtain a recompressed frame, which is stored in the memory. Because the frames that are used in the decoding of other frames or that are displayed are stored in a compressed format, the decoder system requires less memory. However, some drawbacks exist in the related art. Firstly, the recompressed reference frame does not allow easily random accessing of a prediction block within regions of the recompressed reference frames stored in the memory. Secondly, the additional recompression and decompression modules dramatically increase the hardware cost and power consumption of the decoder system. Additionally, these solutions have similar problems when used in a video encoder.

SUMMARY OF THE INVENTION

One objective of the claimed invention is therefore to provide methods of image processing for motion estimation or compensation having reduced memory storage requirements, to alleviate or solve the above-mentioned problems for video encoders and decoders.

According to an exemplary embodiment of the claimed invention, an image processing method for motion estimation or motion compensation is disclosed. A motion compensation procedure disclosed hereafter may include performing motion estimation or motion compensation. The method comprises storing a reference picture into a frame buffer starting at a first starting address; overwriting at least a subset of the reference picture by storing at least a portion of a current picture into the frame buffer starting at a second starting address; protecting a plurality of blocks of the reference picture from being lost while storing each block of the current picture in the frame buffer; performing a motion compensation procedure for a particular block of the current picture at least in a portion of blocks of the reference picture that are being protected; and after overwriting at least a block of the current picture into the frame buffer, changing the plurality of blocks of the reference picture that are being protected to stop protecting at least an expired block of the plurality of blocks of the reference picture that are being protected and to start protecting at least a next block of the reference picture.

According to another exemplary embodiment of the claimed invention, a method of performing image processing is disclosed. The method comprises storing a reference picture into a frame buffer starting at a first starting address; overwriting at least a subset of the reference picture by storing at least a portion of a current picture into the frame buffer starting at a second starting address; protecting a plurality of blocks of the reference picture from being lost while storing each block of the current picture in the frame buffer; and performing a motion compensation procedure for a particular block of the current picture at least in a portion of blocks of the reference picture that are being protected.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
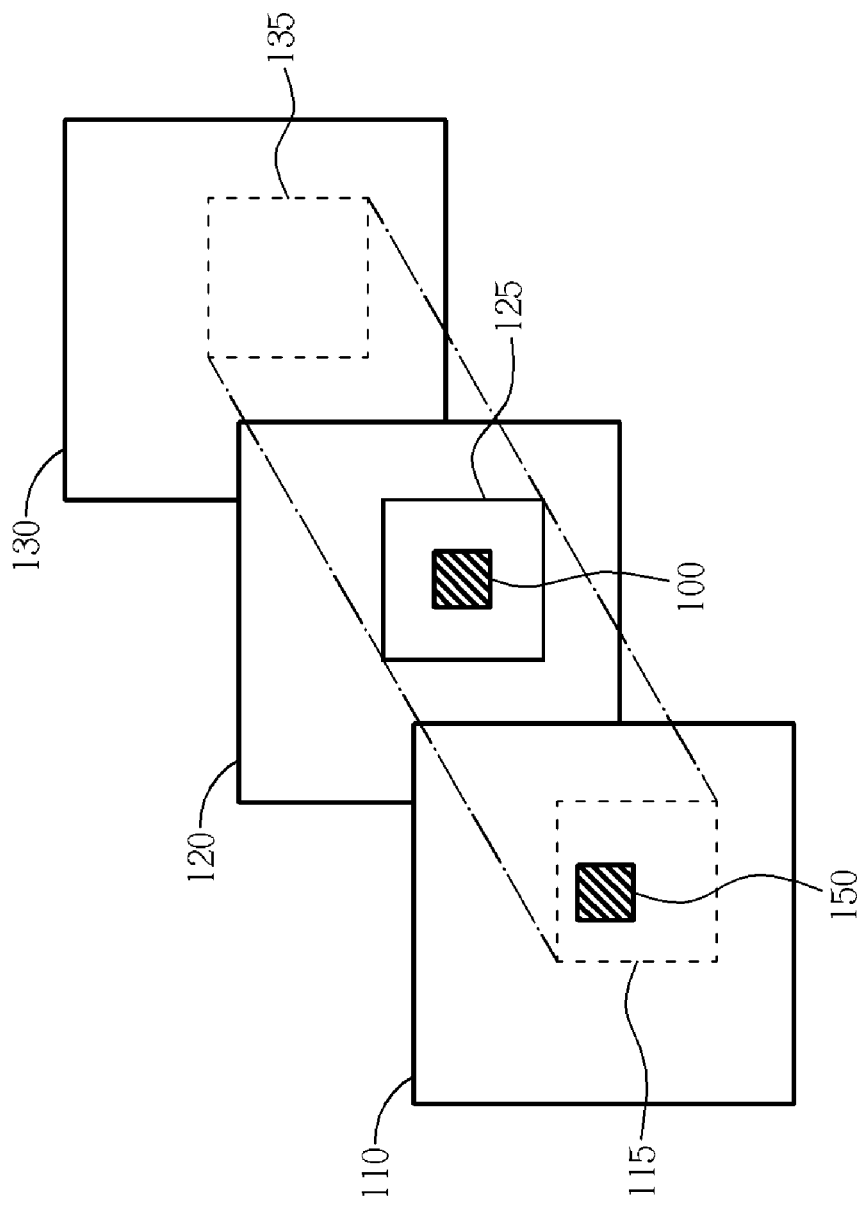
FIG. 1 shows a conventional block-matching process of motion estimation.
Figure 2:
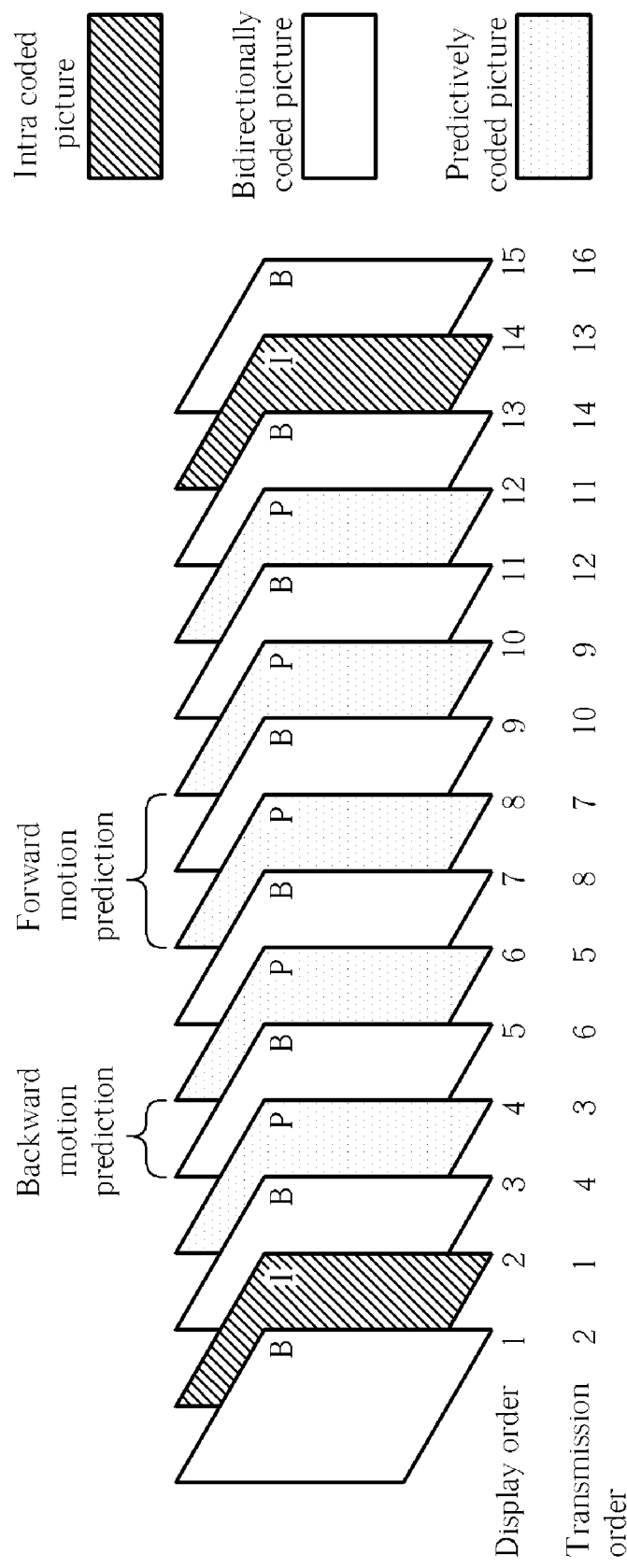
FIG. 2 shows a difference between the display order and the transmission order of pictures of the MPEG-2 standard.
Figure 3:
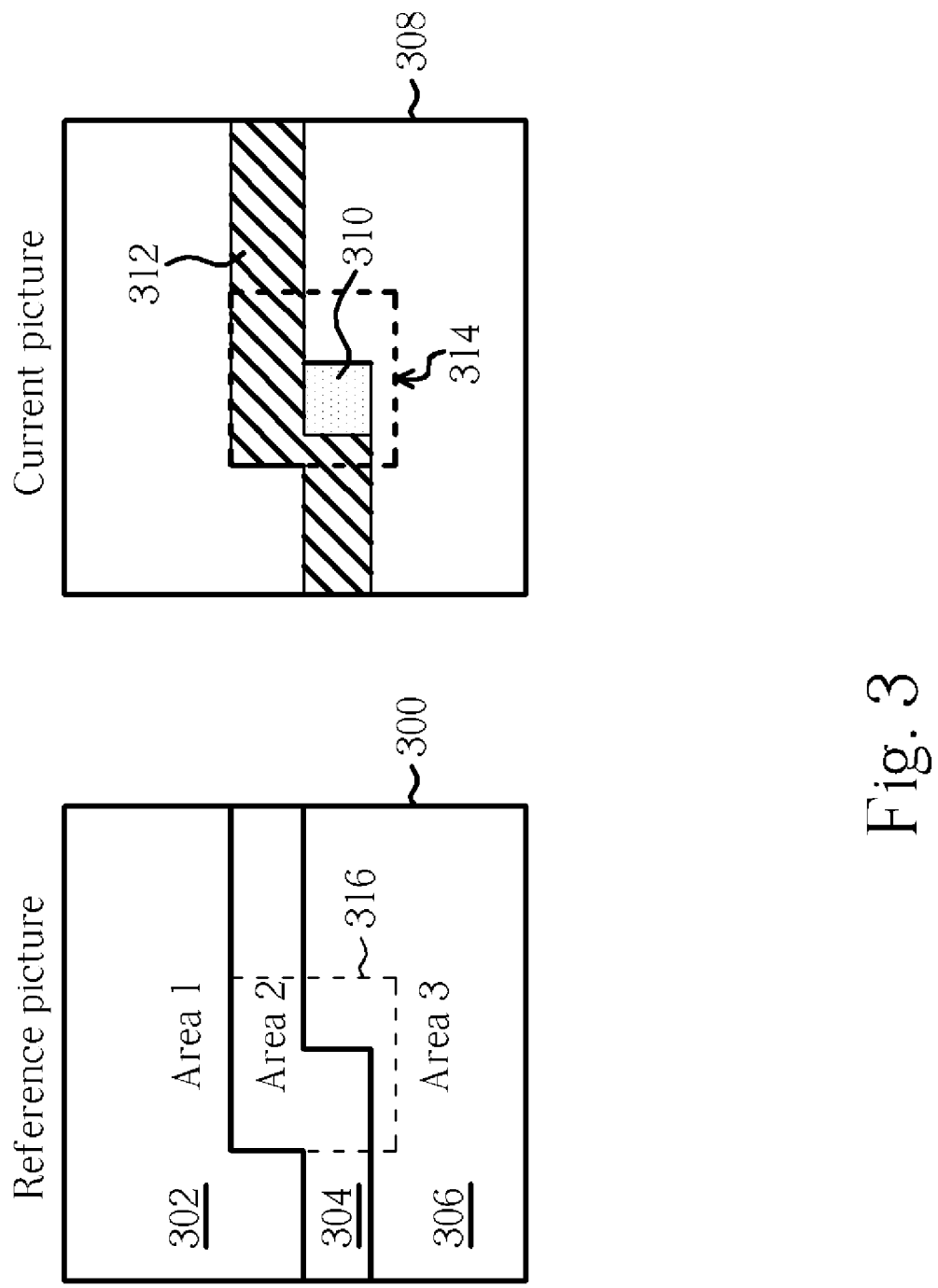
FIG. 3 shows three areas of a reference picture being stored in a frame buffer with respect to the motion compensation procedure of a current macro-block of a current picture according to the present invention.

FIG. 3 shows three areas 302, 304, 306 of a reference picture 300 being stored in a frame buffer with respect to the motion compensation procedure of a current macro-block 310 of a current picture 308 according to the present invention. A motion compensation procedure disclosed hereafter may include performing motion estimation or motion compensation for video encoding or video decoding. An embodiment of the motion compensation procedure is block searching in a search range of the reference picture. As previously mentioned, in order to eliminate temporal redundancies in encoded video information, a process referred to as motion compensation is employed in the MPEG standards. Motion compensation relates to the redundancy between pictures, and before performing motion compensation, a current picture 308 to be processed is typically divided into 16×16 pixel sized macro-blocks (MB) such as current macro-block 310 in FIG. 3. For each current macro-block 310, a most similar prediction block of the reference picture 300 is then determined by comparing the current macro-block 310 with "candidate" macro-blocks of a preceding or succeeding reference picture 300. In particular, the candidate macro-blocks are located in the reference picture 300 within a search range 316 corresponding to a search range 314 in the current picture 308.

For example, assume in FIG. 3 that the macro-blocks of the current picture 308 are processed for either encoding or decoding one by one in order starting from a first macro-block in the upper left corner and proceeding sequentially until a last macro-block in the lower right corner. As shown in FIG. 3, a first area 302 of the reference picture 300 includes macro-blocks that have already been processed in the motion compensation procedure for macro-blocks prior to macro-block 310. Therefore, the data of the reference picture 300 stored in the first area 302 is no longer required. A second area 304 of the reference picture 300 includes macro-blocks that have already been used for processing some macro-blocks in the current picture 308, but are required again for processing at least one upcoming macro-block in the current picture 308. Finally, a third area 306 of the reference picture 300 includes co-located macro-blocks of macro-blocks in the current picture 308 subsequent to the current macro-block 310 that have not yet been processed.

To reduce memory storage requirements, according to a first embodiment of the present invention, the first area 302 of the reference picture 300 in the frame buffer is overwritten with other data. For example, in this embodiment, the first area 302 is overwritten when storing macro-blocks of the current picture 308. In this way, data of the first area 302, which is no longer required, does not waste storage in the frame buffer and the overall size of the frame buffer can be correspondingly reduced. The second area 304 of the reference picture 300 contains macro-blocks that are still required for processing at least one more current macro-block 310 of the current picture 308. For this reason, the data of the second area 304 is still required, thus the data of the second area 304 are protected from being lost while storing each block of the current picture 308 in the frame buffer. Different embodiments of how to protect the plurality of macro-blocks in the second area 304 will be explained in the following figures and description. Finally, the third area 306 of the reference picture 300 contains co-located macro-blocks of macro-blocks in the current picture 308 that have not yet been processed. The data located in this area 306 of the frame buffer cannot be overwritten as it is still required for later motion compensation procedures.

Figure 4:
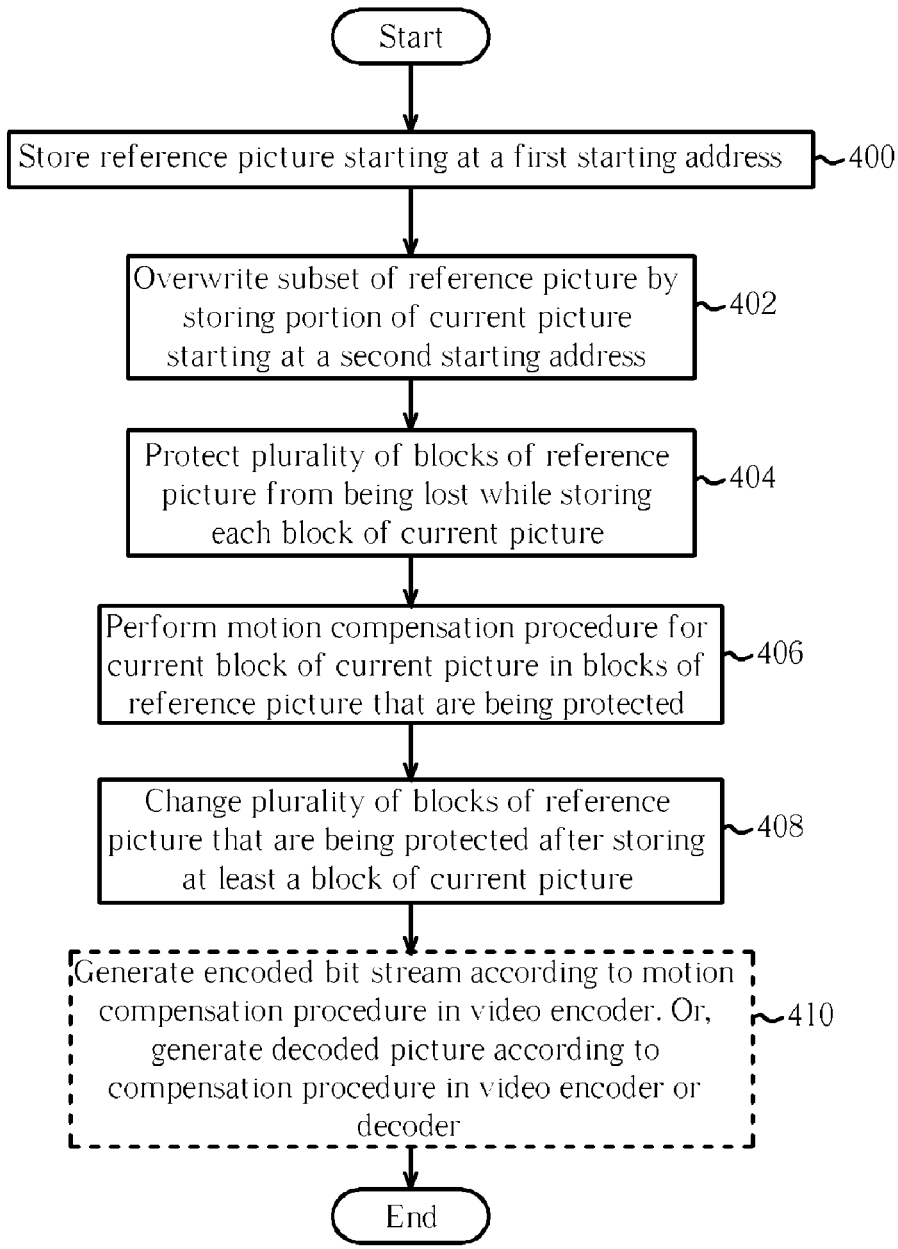
FIG. 4 shows a flowchart of a method of image processing according to a first embodiment.

FIG. 4 shows a flowchart of a method of image processing according to a first embodiment. Provided that substantially the same result is achieved, the steps of the flowchart of FIG. 4 need not be in the exact order shown and need not be contiguous, that is, other steps can be intermediate. According to this embodiment, performing motion compensation includes the following steps:

Step 400: Store a reference picture 300 into a frame buffer starting at a first starting address.

Step 402: Overwrite at least a subset of the reference picture by storing at least a portion of a current picture 308 into the frame buffer starting at a second starting address.

Step 404: Protect a plurality of blocks of the reference picture (the second area 304 in FIG. 3) from being lost while storing each block of the current picture in the frame buffer.

Step 406: Perform a motion compensation procedure for a current block of the current picture at least in a portion of blocks of the reference picture that are being protected.

Step 408: Change the plurality of blocks of the reference picture that are being protected after storing at least a block of the current picture into the frame buffer to stop protecting at least an expired block of the plurality of blocks of the reference picture that are being protected and to start protecting at least a next block of the reference picture. The expired block is a block in the reference picture that will no longer be used in later motion compensation procedures so that it can be overwritten by a co-located block of the current picture.

Step 410: Generate an encoded bit stream according to the motion compensation procedure for blocks being stored in the frame buffer when performing motion estimation in a video encoder. Or, generate a decoded picture being stored in the frame buffer when performing motion compensation in a video encoder or decoder.

Figure 5:
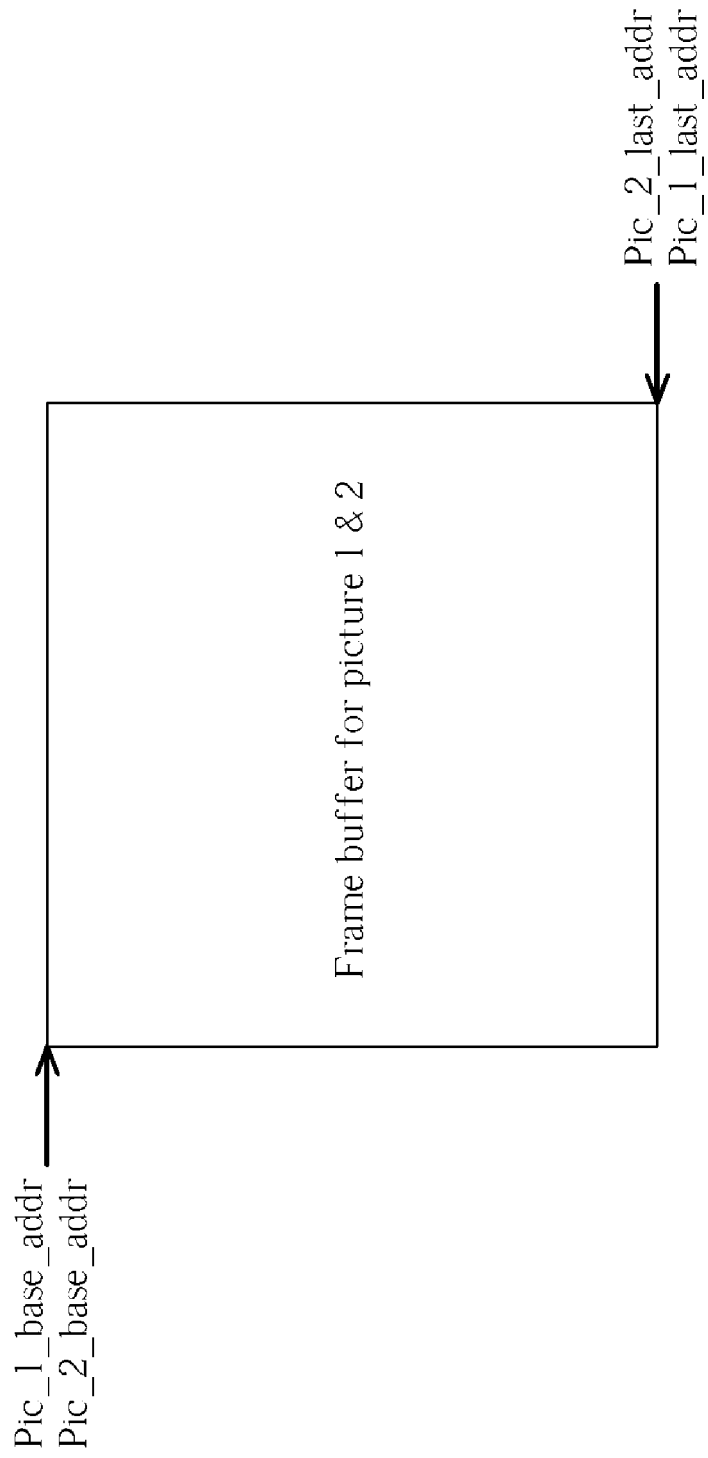
FIG. 5 shows the reference picture and the current picture being stored in the frame buffer with the same starting address according to one embodiment of FIG. 4.

FIG. 5 shows the reference picture 300 and the current picture 308 being stored in the frame buffer with the same starting address according to one embodiment of FIG. 4. In this embodiment, the reference picture 300 is first stored in the frame buffer starting at the first starting address being equal to pic_1_base_addr in FIG. 5, and then motion compensation is performed block by block for each current macro-block 310 of the current picture 308. After the motion compensation procedure has been completed for the current block 310, the current macro-block 310 of the current picture 308 is stored in the frame buffer starting at the second starting address pic_2_base_addr being equal to pic_1_base_addr. Therefore, as the blocks of the current picture 308 are stored in the frame buffer, they overwrite a portion of the reference picture 300. Typically, each picture (whether reference or otherwise) will have the same maximum storage size. Therefore, according to this embodiment, the frame buffer only needs to have a size being equal to storage requirements for the reference picture (or a size being equal to storage requirements for the current picture). This equates to reducing the memory storage requirements of the frame buffer by one half.

Figure 6:
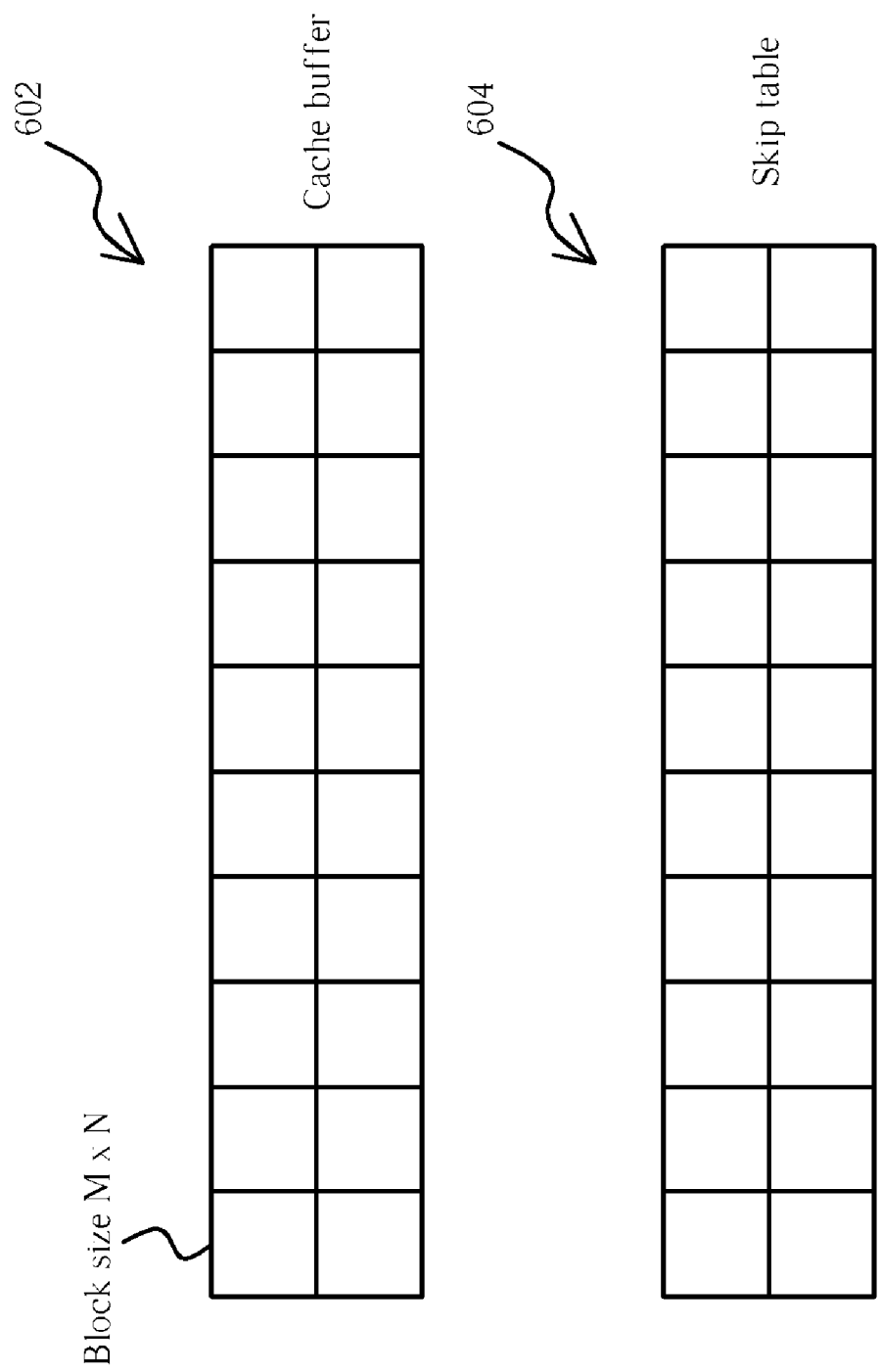
FIG. 6 shows a cache buffer and skip table according to the embodiment of FIG. 5.

FIG. 6 shows a cache buffer and skip table utilized with the frame buffer shown in FIG. 5 according to some embodiments of the image processing method. As mentioned above, the plurality of blocks of the reference picture in the second area 304 must be protected from being lost while storing each block of the current picture 308 in the frame buffer. This is because the macro-blocks in the second area 304 are still required for upcoming motion compensation procedures. To allow for protection of the blocks in the second area 304, in this embodiment, the protected macro-blocks of the reference picture are stored in a cache buffer 602. In some other embodiments, it is the current picture being stored in the cache buffer in order to protect the blocks in the second area 304 of the reference picture. The cache buffer is typically implemented external to the frame buffer and each block stores a single M×N macro-block (i.e, a 16×16 macro-block in this example).

It should also be noted that the above-described method of performing motion compensation procedure is suitable for use in both video encoders and video decoders. For example, when utilized to perform motion estimation in an encoder, the flowchart of FIG. 4 can also include step 410 for generating an encoded bit stream according to the motion compensation procedure for blocks being stored in the frame buffer. Likewise, when the method is utilized to perform motion compensation in a decoder, the additional step 410 is included for displaying blocks being stored in the frame buffer.

Figure 9:
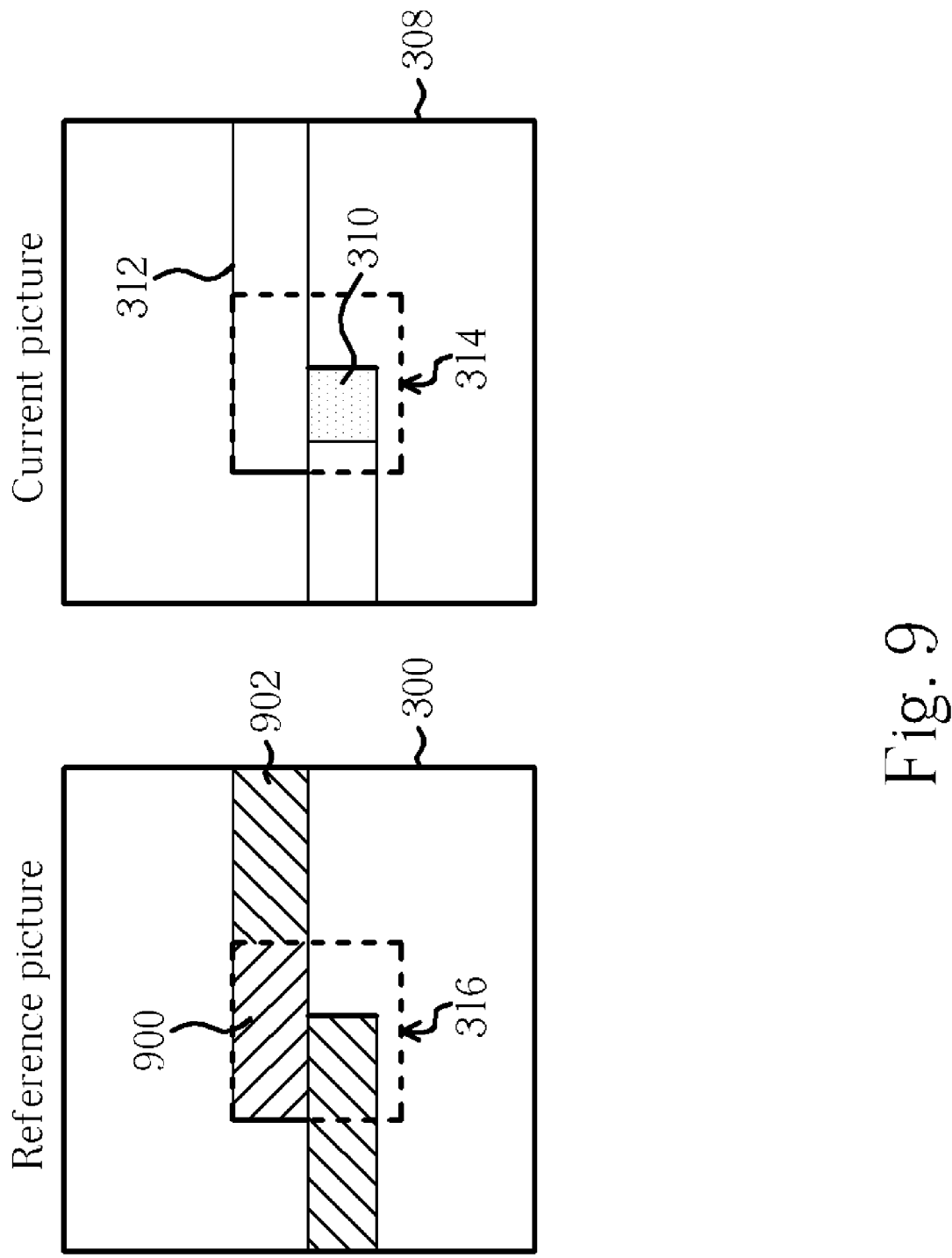
FIG. 9 shows an alternative embodiment for protecting memory in step 404 of FIG. 4 by utilizing a search range cache.

FIG. 9 shows an alternative embodiment of step 404 for protecting the area 304. Typically video decoders will employ a search range cache, which is effectively a memory device storing the section 316 of the reference picture 300 shown in FIG. 9. Because the search range cache of the encoder already stores section 316, there is no need to protect this section 900 in the cache buffer 602. In this way, step 404 can be modified such that protecting the plurality of blocks of the reference picture by storing a search range 316 of the reference picture that are being protected in a search range buffer utilized during a motion estimation process of the video encoder, and storing a remaining plurality of blocks 902 of the reference picture that are being protected in a cache buffer. In this way, the memory requirements of the cache buffer 602 are further reduced by the size of the section 900.

When utilized in a video decoder, it should be pointed out that an aggressive synchronization scenario of video decoding and display can be used to ensure that blocks are properly decoded in time for display. That is, if blocks of the current picture are initially stored in the cache buffer to protect particular blocks (area 304 or 902 shown in FIG. 9) of the reference picture, the blocks stored in the cache buffer may be read out for both display and re-storing back to original locations in the frame buffer. The blocks stored in the cache buffer are re-stored back to the frame buffer after blocks have been displayed in time for future motion compensation procedures. If the cache buffer is used for storing the particular blocks of the reference picture required of protecting from overwriting, the blocks stored in the cache buffer can be display without re-storing back to the frame buffer.

To optimize this image processing process for motion estimation or motion compensation, an enhancement can be implemented by further including a skip table 604 shown in FIG. 6 to indicate which macro-blocks are classified as skip blocks. Classification of skip blocks is readily understood by a personal of ordinary skill in the art and further description of the actual classification process is therefore omitted herein. Each block that has been classified as a skip block can have a corresponding bit set in the skip table 604. In this way, blocks that are classified as skip blocks, are not stored to the frame buffer because the original data of the reference picture stored in the frame buffer is appropriate for current picture too, therefore the operation of overwriting the block into the frame buffer is skipped. This enhancement saves time and reduces bandwidth requirements to the frame buffer.

Figure 7:
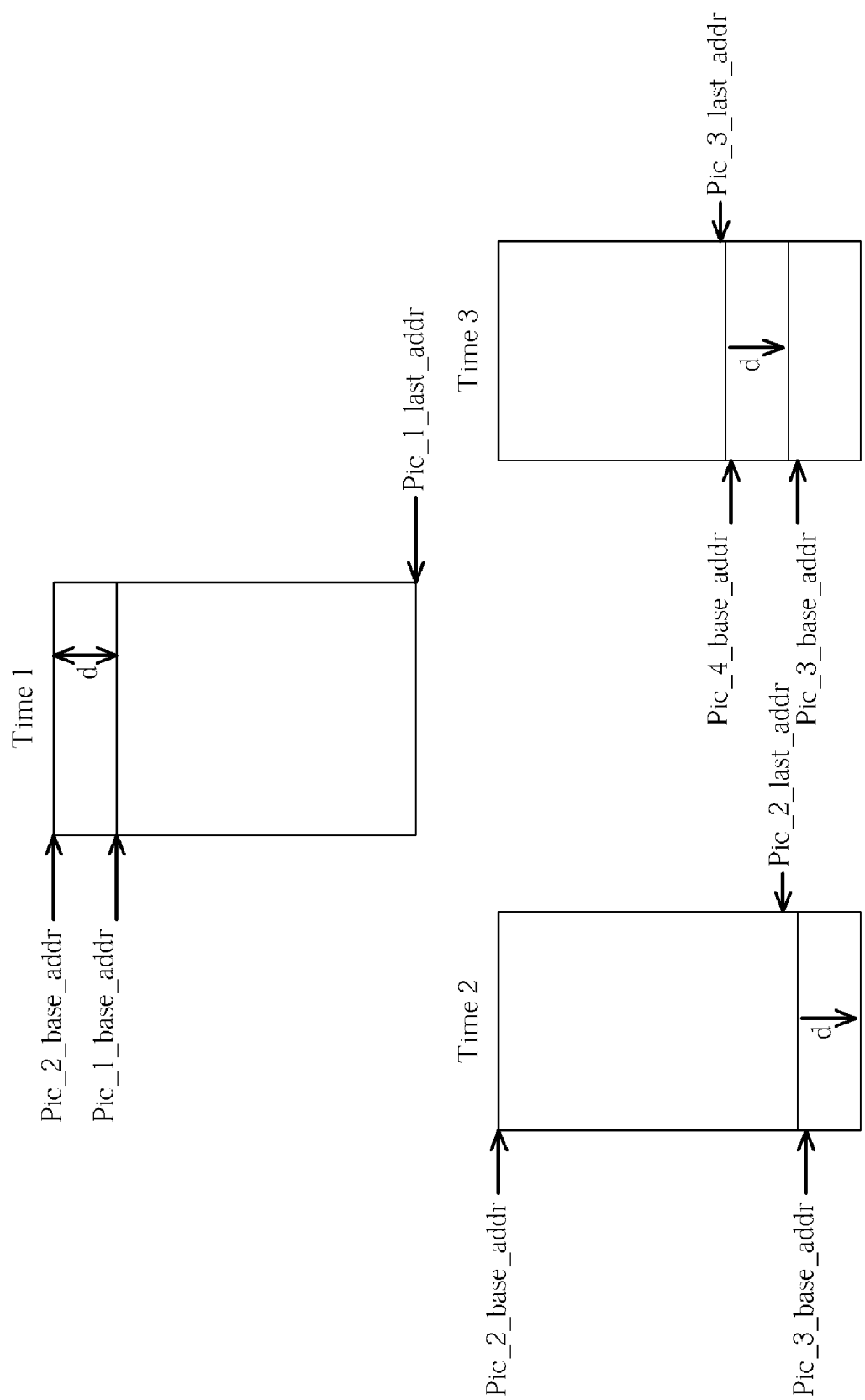
FIG. 7 shows the reference picture and the current picture of FIG. 3 being stored in a frame buffer with starting addresses being separated according to a second embodiment of FIG. 4.

FIG. 7 shows the reference picture 300 and the current picture 308 of FIG. 3 being stored in a frame buffer with starting addresses being separated according to a second embodiment of FIG. 4. As shown in FIG. 7, in this embodiment, protecting the plurality of blocks of the reference picture in step 404 is implemented by defining a first starting address for the reference picture (pic_1_base_addr in FIG. 7), which is separated from a second starting address for the current picture (pic_2_base_addr) by a difference d being equal to or greater than a size of the plurality of blocks of the reference picture that are to be protected. That is, the minimum d corresponds to a size being equal to the size of the second area 304 in FIG. 3. In this way, the frame buffer has a size being equal to storage requirements for the reference picture plus the plurality of blocks of the reference picture that are to be protected, or has a size being equal to storage requirements for the current picture plus the plurality of blocks of the reference picture that are to be protected, whichever is larger. During the motion compensation procedure, the difference d between a previous starting address (for example, pic_1_base_addr) and a current starting address (for example, pic_2_base_addr) remains constant while the actual values of the previous starting address and the current starting address change with each new current picture being stored in the frame buffer. Here, since the starting address of each upcoming picture changes in a circular manner, the difference d is composed of the blocks subsequent to the current starting address as shown in the examples of FIG. 7. In this way the operation of updating the starting addresses of an upcoming picture is similar to a circular buffer. Although memory storage requirements of the frame buffer are slightly increased in comparison with the previous embodiment, no cache buffer is required in this embodiment.

Figure 10:
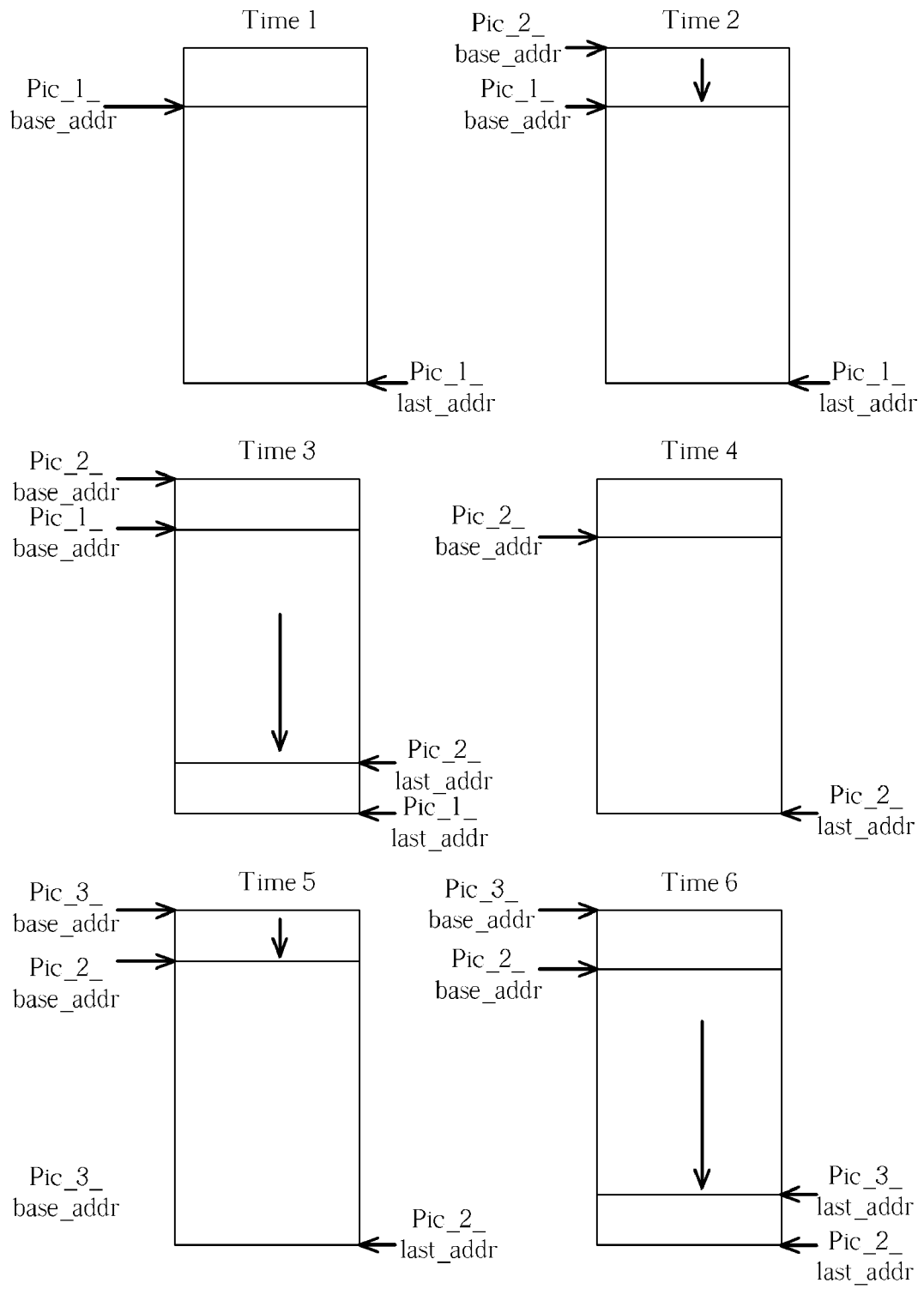
FIG. 10 shows the reference picture and the current picture of FIG. 3 being stored in a frame buffer with starting addresses being separated according to another embodiment of FIG. 4.

Alternatively, in another embodiment as shown in FIG. 10, the values of the previous starting address and the current starting address in the frame buffer are fixed for each new reference picture 300 and each new current picture 308 being stored in the frame buffer. That is, when the current picture becomes a new reference picture for a new current picture, the entire data corresponds to the new reference picture need to be moved from the current starting address to the previous starting address before storing the data corresponding to the new current picture into the frame buffer.

As shown in FIG. 10, at time 1, pic_1 is stored in the frame buffer after it has been completely processed. At time 2, processing of pic_2 is started, and pic_2 is stored from the top of the frame buffer and gradually overwrites pic_1. When pic_2 has been completely processed, at time 3, a portion of pic_1 is overwritten. At time 4, since pic_1 is no longer needed, the entire pic_2 is moved (or copied) to where pic_1 was originally located. During relocating pic_2, blocks are read from the frame buffer and can also be output for display. Note that this alternative embodiment including output for display needs to consider the capacity of the system. For example the decoding speed and the requirements for display need to be sufficient. Next, at time 5, processing of pic_3 is started. When pic_3 has been completely processed, at time 6, a portion of pic_2 is overwritten, and the process continues in the above-described manner.

Figure 11:
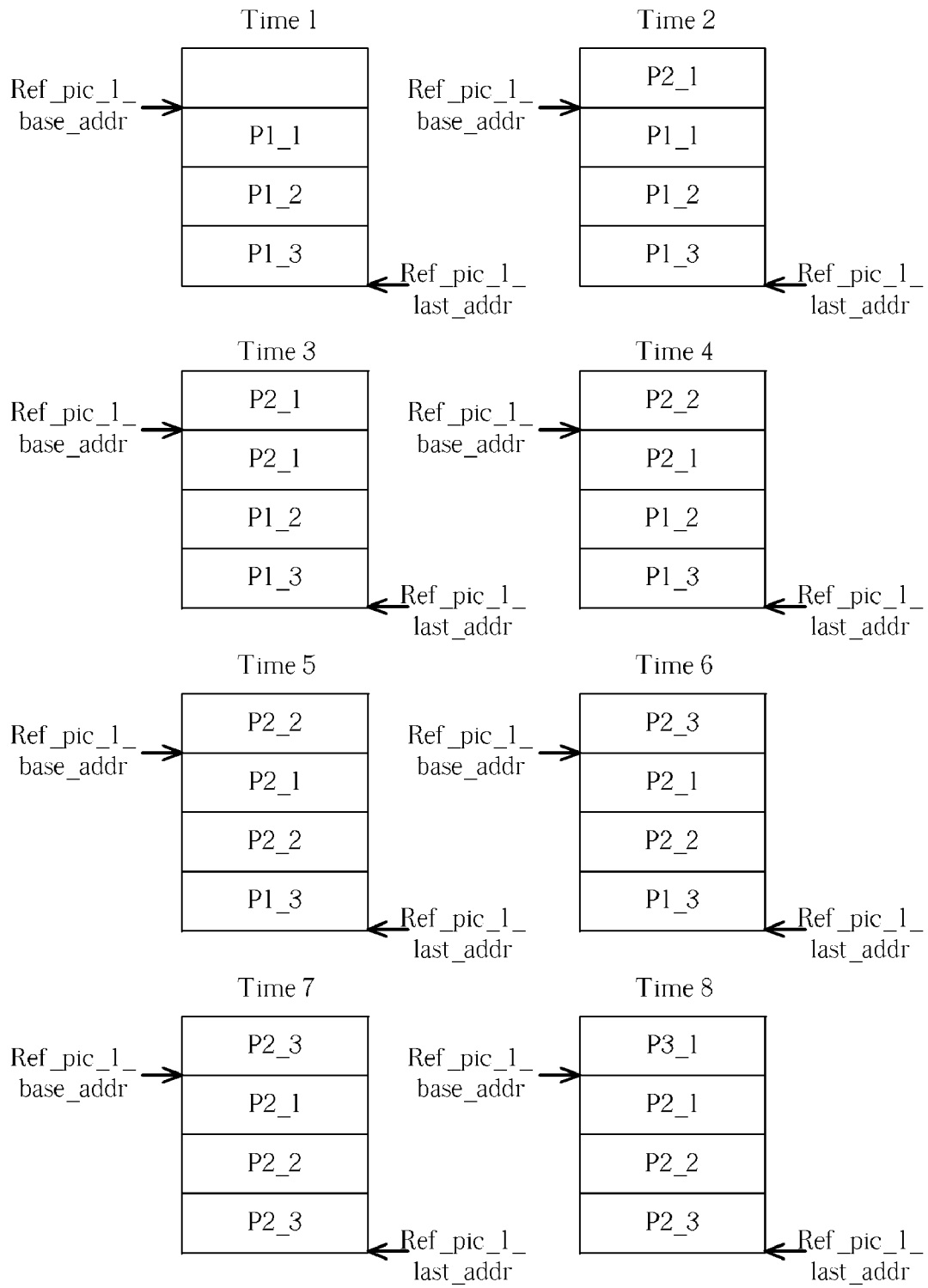
FIG. 11 shows the reference picture and the current picture of FIG. 3 being stored in a frame buffer with starting addresses being separated according to another embodiment of FIG. 4.

FIG. 11 shows yet another alternate embodiment, which is similar to the embodiment shown in FIG. 10. The difference between the embodiments of FIG. 10 and FIG. 11 is that the previous embodiment shown in FIG. 10 moves/copies an entire picture/frame at a time after completely processing the picture/frame. However, in the embodiment of FIG. 11, the picture is divided into several portions, and each portion is moved/copied after the portion is finished being processed. The example shown in the following pictures divides each picture into 3 portions. It should be noted that in all embodiments, the protected area needs to be greater than or equal to "area 2" in FIG. 3, or 902 in FIG. 9 if a block search buffer is used.

As shown in FIG. 11, at time 1, pic_1 is completely processed. At time 2, portion 1 of pic_2 (P2_1) is stored in the first section of the frame buffer. At time 3, portion 1 of pic_1 (P1_1) is not required when finishing the processing of portion 1 of pic_2 (P2_1). For this reason, P2_1 is moved/copied to the second section to overwrite P1_1. Again, during relocating P2_1, P2_1 can be output for display. The first (top) section of the frame buffer acts like a cache buffer as shown in FIG. 6. At time 4, processing of P2_2 is started by storing into the first section of the frame buffer to overwrite P2_1. At time 5, when P1l2 is no longer required, P2_2 is copied to the third section of the frame buffer to overwrite P1l2. At time 6, processing of P2_3 is started. At time 7, when P1_3 is no longer required, P2_3 is copied to the fourth section of the frame buffer to overwrite P1_3. Finally, at time 8, processing of pic_3 is started, which starts a new cycle performed in the same manner as described above.

Figure 8:
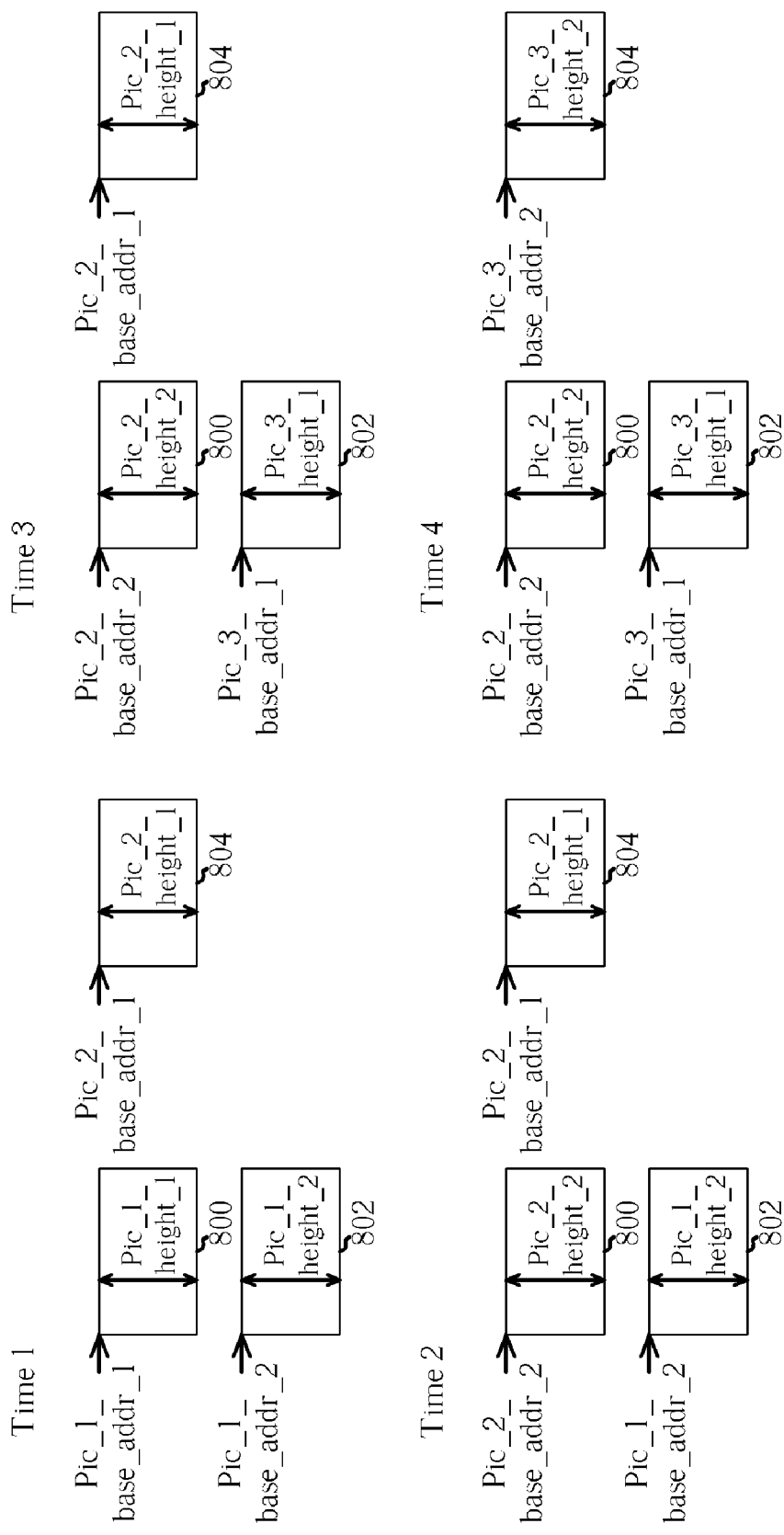
FIG. 8 shows the reference picture and the current picture being stored into three separable buffers according to a third embodiment of the FIG. 4.

FIG. 8 shows the reference picture 300 and the current picture 308 being stored into three separable buffers 800, 802, 804 according to a third embodiment of the FIG. 4. This embodiment is very similar to the embodiment shown in FIG. 7; however, in FIG. 8, three different storage banks of the frame buffer are utilized to store blocks of the reference picture 300 and the current picture 308. Notice that the number of separable buffers is not limited to three as each picture can be divided into N portions, and at least N+1 buffers are required for buffering the processed data of upcoming pictures. In an embodiment, the frame buffer is implemented as a dynamic random access memory (DRAM), and each separable buffer can be implemented as a different bank of the DRAM. During operations, at Time 1, a first portion of the reference picture (Pic_1) is first stored into a first storage bank 800, a second portion of the reference picture is stored into a second bank 802, a first portion of the current picture (Pic_2) is stored into a third bank 804, and at Time 2, a second portion of the current picture is stored into the first storage bank 800 which overwrites the first potion of the reference picture. At Time 3, a first potion of a next picture (Pic_3) is stored into the storage bank 802, and at Time 4, a second portion of a next picture is stored into the storage bank 804. Successive pictures will be stored into these storage banks 800, 802, 804 in the same order. In this way, DRAM page misses are reduced during the motion compensation procedure.

It should also be noted that although the above description has focused on motion estimation or compensation using "I" intra-coded pictures, "P" predicted Pictures, as will be readily apparent to a person of ordinary skill in the art, support of "B" bi-directional interpolated pictures is easily incorporated. For example, by further including a frame buffer for storing decompressed B pictures, each macro-block of a P picture can be coded with respect to the closest previous I picture, or with respect to the closest previous P picture. Then, each macro-block of a B picture can be coded by forward prediction from one or more past I picture or P picture, by backward prediction from one or more future I picture or P picture, or bi-directionally using both past I picture(s) or P picture(s) and future I picture(s) or P picture(s).

By storing a reference picture into a frame buffer starting at a first starting address, overwriting at least a subset of the reference picture by storing at least a portion of a current picture into the frame buffer starting at a second starting address, and protecting a plurality of blocks of the reference picture from being lost while storing each block of the current picture in the frame buffer, when performing a motion compensation procedure for a particular block of the current picture in the plurality of blocks of the reference picture that are being protected, the present invention methods allow a significant reduction in the memory storage requirements of the frame buffer.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of performing image processing, the method comprising:
    storing a reference picture into a frame buffer starting at a first starting address;
    overwriting at least a subset of the reference picture by storing at least a portion of a current picture into the frame buffer starting at a second starting address;
    protecting a plurality of blocks of the reference picture from being lost while storing each block of the current picture in the frame buffer;
    performing a motion compensation procedure for a particular block of the current picture at least in a portion of blocks of the reference picture that are being protected;
    storing the particular block of the current picture in the frame buffer; and
    after overwriting at least a block of the current picture into the frame buffer, changing the plurality of blocks of the reference picture that are being protected to stop protecting at least an expired block of the plurality of blocks of the reference picture that are being protected and to start protecting at least a next block of the reference picture.

2. The method of claim 1, further comprising performing the motion compensation procedure for the particular block of the current picture in a subset of the plurality of blocks of the reference picture that are being protected according to a designated search range for the particular block.

3. The method of claim 2, wherein the protected blocks of the reference picture are co-located blocks of blocks of the current picture that have already been processed, but the protected blocks will again be utilized during the motion compensation procedure for successive blocks.

4. The method of claim 1, wherein the first starting address is equal to the second starting address.

5. The method of claim 1, wherein protecting the plurality of blocks of the reference picture comprises storing the plurality of blocks of the reference picture that are being protected in a cache buffer.

6. The method of claim 1, wherein protecting the plurality of blocks of the reference picture comprises storing blocks of the current picture that are co-located blocks of the protected blocks of the reference picture in a cache buffer.

7. The method of claim 6, further comprising displaying blocks being stored in the cache buffer and re-storing the displayed blocks back to original locations in the frame buffer after blocks have been displayed.

8. The method of claim 1, wherein protecting the plurality of blocks of the reference picture comprises storing a first plurality of blocks of the reference picture that are being protected in a search range buffer utilized during a motion estimation process, and storing a remaining plurality of blocks of the reference picture that are being protected in a cache buffer.

9. The method of claim 1, wherein the frame buffer has a size being equal to storage requirements for the reference picture or has a size being equal to storage requirements for the current picture.

10. The method of claim 1, wherein the method is utilized to perform motion estimation in an encoder and further comprises generating an encoded bit stream according to the result of the motion compensation procedure for the processed blocks.

11. The method of claim 1, wherein the method is utilized to perform motion compensation in a decoder and further comprises displaying blocks being stored in the frame buffer.

12. The method of claim 1, further comprising not storing blocks that are classified as skip blocks into the frame buffer.

13. A method of performing image processing, the method comprising:
    storing a reference picture into a frame buffer starting at a first starting address;
    overwriting at least a subset of the reference picture by storing at least a portion of a current picture into the frame buffer starting at a second starting address;
    protecting a plurality of blocks of the reference picture from being lost while storing each block of the current picture in the frame buffer;
    performing a motion compensation procedure for a particular block of the current picture according to at least a portion of blocks of the reference picture that are being protected; and
    storing the particular block of the current picture in the frame buffer.

14. The method of claim 13, wherein protecting the plurality of blocks of the reference picture comprises defining the first starting address to be separated from the second starting address by a difference being equal to or greater than a size of the plurality of blocks of the reference picture that are to be protected.

15. The method of claim 13, further comprising performing the motion compensation procedure for the particular block of the current picture in a subset of the plurality of blocks of the reference picture that are being protected according to a designated search range for the particular block.

16. The method of claim 15, wherein the plurality of blocks of the reference picture that are being protected comprise co-located blocks of the current picture that have already been processed, but the protected blocks will again be utilized for performing motion compensation for successive blocks.

17. The method of claim 13, wherein the frame buffer has a size being equal to or greater than storage requirements for the reference picture plus the plurality of blocks of the reference picture that are to be protected, or has a size being equal to storage requirements for the current picture plus the plurality of blocks of the reference picture that are to be protected.

18. The method of claim 13, wherein the difference between the first starting address and the second starting address remains constant while values of the first starting address and the second starting address change with each new reference picture or each new current picture being stored in the frame buffer.

19. The method of claim 13, wherein values of the first starting address and the second starting address in the frame buffer are fixed for each new reference picture or each new current picture being stored in the frame buffer.

20. The method of claim 13, further comprising:
    providing first, second, and third storage banks within the frame buffer for use when storing the reference picture and the current picture;
    storing a first portion of the reference picture into the first storage bank;
    storing a second portion of the reference picture into the second bank;
    storing a first portion of the current picture into the third bank; and
    storing a second portion of the current picture into the first storage bank.

21. The method of claim 20, wherein the frame buffer is a dynamic random access memory and each storage bank is a different bank of the dynamic random access memory.

22. The method of claim 13, wherein the method is utilized to perform motion estimation in an encoder and further comprises generating an encoded bit stream according to the result of the motion compensation procedure for processed blocks.

23. The method of claim 13, wherein the method is utilized to perform motion compensation in a decoder and further comprises displaying blocks being stored in the frame buffer.

* * * * *